2,580,437

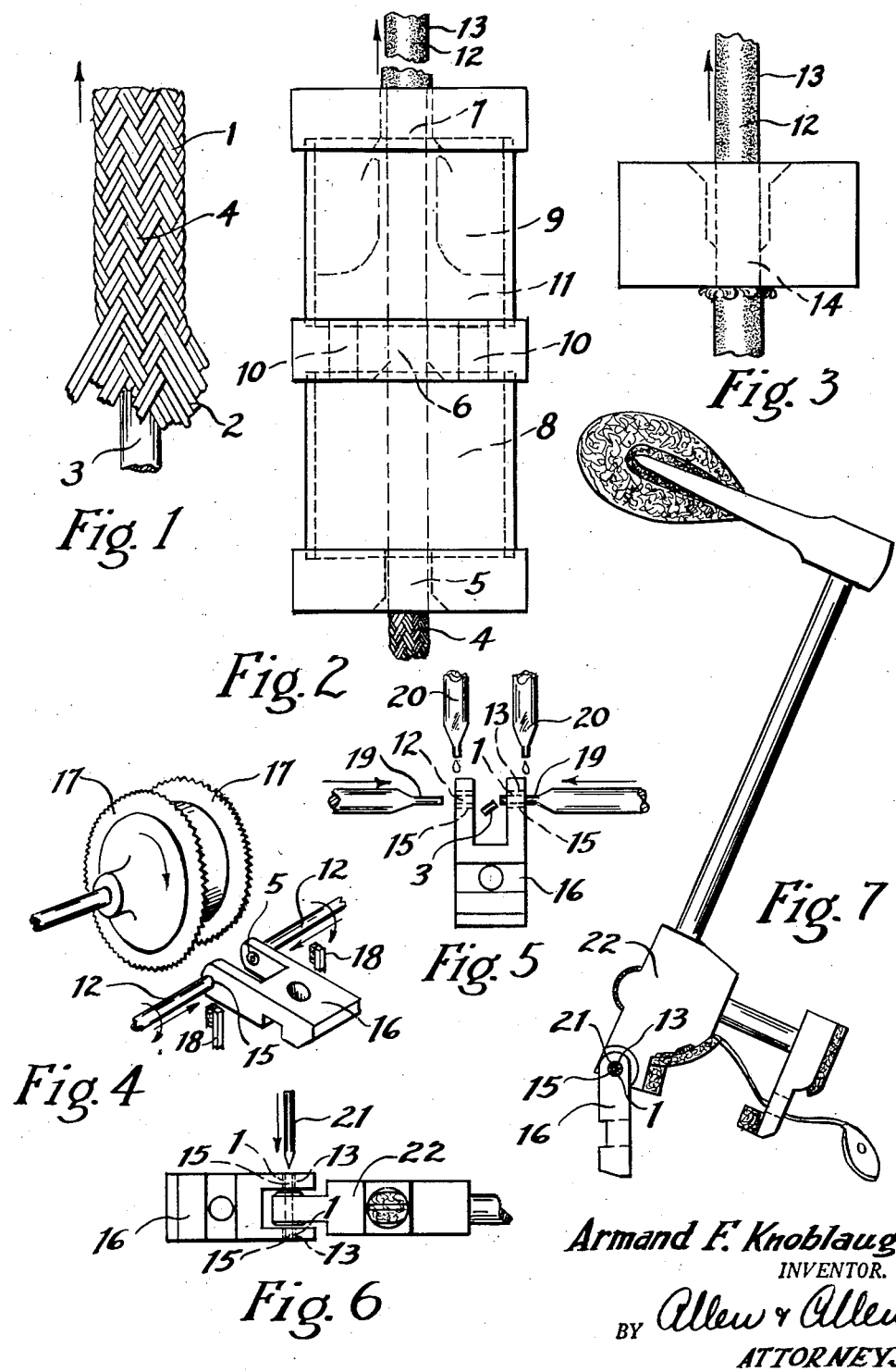
Jan. 1, 1952 — A. F. KNOBLAUGH — 2,580,437
BEARING, BEARING MATERIAL, AND METHOD OF FABRICATING BEARINGS
Filed June 16, 1948
Armand F. Knoblaugh
INVENTOR.
BY Allen & Allen
ATTORNEYS Patented Jan. 1, 1952

UNITED STATES PATENT OFFICE 2,580,437

BEARING, BEARING MATERIAL, AND METHOD OF FABRICATING BEARINGS

Armand F. Knoblaugh, Cincinnati, Ohio, assignor to The Baldwin Company, Cincinnati, Ohio, a corporation of Ohio Application June 16, 1948, Serial No. 33,404

16 Claims. (Cl. 29—149.5)

1

This invention relates to bearings. It is particularly applicable to pin bearings such as are used in pianos in the pivotal connections forming part of the actions of such instruments.

One object of the invention is to provide an advantageous material for the bearings in these pivotal connections, which material can be made by machinery in continuous-type operations, and through the use of which material desired bearing structures for the purpose can be formed by machine operations.

Another object is to provide a bearing material and bearing assembly in which, once an appropriate portion of the material is united with its bearing holder, a desired bearing structure is formed without further mechanical operations on it.

Still another object is to provide a material for and method of making bearings in which the component materials employed and the use of material, are economical.

In certain of its features the invention parallels that described in my copending application Serial No. 20,316 filed April 10, 1948, and entitled Pin Bearings, Material Therefor, and Method of Making. In this respect the objects stated above are similar to those expressed in the copending application. The present invention, however, provides significant improvements over that of the copending application, and to these improvements the following additional objects are directed.

It is an object of the present invention to provide a method and structure, throughout which material directed to bearings has dimensional stability.

It is an object to provide improved means for determining the interior form of bearing material, and of relating the interior form to a center pin or shaft which is to operate in a bearing assembly employing the material.

It is an object to provide improved means for determining the exterior size of bearing material, and of relating the exterior size to the receiving opening in a bearing holder.

The manner in which the above objects are attained, and the attainment of other objects, which will be pointed out later herein or will become apparent to those skilled in the art on reading this specification will now be described in detail, with reference to the accompanying drawings forming a part hereof, wherein:

Figure 1 is a fragmentary view of an initial operation in forming cylindrical bearing material, illustrating the braiding of filar elements on a dimensioning core;

2

Figure 2 is a view of a further operation, comprising coating the cylindrical material of Figure 1;

Figure 3 illustrates removal of a layer of hardened coating such as applied in Figure 2, by means of a shaving die;

Figure 4 is a diagram of a part of a method of forming bearings in a piano action member, using material such as fabricated in the aforementioned figures;

Figure 5 is a diagram of the remaining part of the method partially shown in Figure 4;

Figure 6 is a view of the piano action member of Figures 4 and 5, with bearings therein and being pinned to another member shown partially; and Figure 7 is a complete side view of the two action members of Figure 6 pinned together to form a pivotal connection of the two members.

The centers in a piano action, i. e., the pivotal connections on which the action members swing back and forth, must be low in friction, quiet in operation, and durable and firm with little sideplay or "knock," under the impacts imposed in piano playing. To provide these centers, the bearings or bushings therefor in which the action shafts or center pin oscillate on their axes, must be constructed to obtain the characteristics desired. In the current practice of the art, such bearings are formed by a considerable number of manual operations employing cloth woven from sheep's wool as a raw material since it has inherent qualities desired, in which operations desired density and resilience are impressed in the bearings. I have described these operations in the aforementioned copending application Serial No. 20,316.

The invention specified in the application Serial No. 20,316 improved the art by providing bearing material and bearings both of which could be fabricated by machine operations, in which the material was used economically, and wherein the material had most of the desirable characteristics built into it, so that once an appropriate portion of the material was united with a bearing holder the structure was suitable as a bearing without further mechanical operations on it. In brief, in the invention set forth in the application Serial No. 20,316, bearing material was formed by braiding a cylindrical tube of elastic filar elements having other desired qualities, then tensioning the tube so as to draw the braid elements together and reduce the tube diameter, and covering the tube while tensioned with a liquid cement which hardened upon drying to a desired tensile strength and adhered strongly to the braided tube, the tension being maintained until the coating dried. The tensioning increased the density and resilience of the braided structure, as desired, which characteristics were maintained by the hardened coating. The tension, and the quality and amount of cement, were selected so that upon drying of the coating, the inside diameter of the material was properly related to a center pin and the outside diameter was adapted to a receiving hole in a bearing holder.

The present invention maintains all the advantages described in the application Serial No. 20,316 but provides important improvements in dimensional accuracy. Briefly, desired interior form of bearing material in the present development is obtained by tubularly braiding the elements tightly on a selected core rod or wire, and accuracy of exterior size is acquired either by precise coating of the braided tube containing the core, with liquid cement as mentioned above, or by excess coating with the cement and then removing surplus coating in a precise manner, after the cement has dried.

Thus in Figure 1 of the accompanying drawings I have shown a tube 1 being braided from elements 2, tightly on a core rod or wire 3, which operation can be carried out continuously by machine with core material 3 being continuously fed and retained within the tube. A vertical arrow in Figure 2 illustrates the direction of motion of the braided tube and its core, which when united become the cylindrical material 4. The braid elements 2 are in the form of cords, tight yarn, or thread, and as in the invention set forth in the application Serial No. 20,316 in selecting substances of desired qualities for these elements it is not beyond my present invention to use resilient textile materials such as wool or silk, or even rubber elements. However, as a matter of preference I employ nylon, a synthetic protein-like material, the term nylon being generic for any long-chain synthetic polymeric amide which has recurring amide groups as an integral part of the main polymer chain, and which is capable of being formed into a filament whose structural elements are oriented in the direction of the axis. Nylon, as a textile material, has advantages of appreciable elasticity, tensile strength, and resistance to abrasive wear. As is characteristic of textile fabrics, fabrics composed of nylon filamentary elements are essentially sound absorbent and noiseless under impact and contact movement of other materials thereupon.

In a practice of my invention I may employ— for the braid elements 2—either nylon thread or yarn, a yarn being defined as an extending array of parallel fundamental filaments, either twisted or untwisted, whereas thread is a twist of two or more twisted yarns. In using thread in a present practice, I prefer a nylon sewing thread known in the thread industry as size B and having a weight of about 425 denier (grams per 9000 meters length). With this, I compose each of the braid elements 2 of a pair of such threads, as is illustrated in Figure 1, and in braiding the tube 1 in preparing a material for an exemplary purpose to be described, there are twenty-four of such elements (thus forty-eight size B threads in total) criss-crossed and interwoven as shown, with about thirty-five criss-crosses of the elements (which criss-crosses are termed picks by braiders) per inch of braid length. I also use nylon yarn and as an equivalent to the above mentioned thread I employ 210 denier, 34 filament yarn, using four of such yarns per braid element 2 (or ninety-six yarns in total).

As mentioned above, the tube 1 is braided tightly on a core rod or wire 3. With this the braid elements 2 are placed under tension. As in the invention of the above identified application Serial No. 20,316, the elements 2 are thus drawn together so that a desired density and resilience are embodied in the tube 1. A significant feature of the present invention is that this tight braiding on a core 3 also defines the interior form of the tube 2. The characteristics of density and resilience, with the defined interior form, are preserved on hardening of a liquid cement coating to be applied as will be described later herein, and maintained even after removal of the core 3. The braiding is also advantageous in preventing the cement coating from penetrating into the interior of the tube 1. It has the further advantage of "flattening" the braid elements somewhat against the core wire 3 thus improving the interior surface of the braid for a center pin to be used with bearings made from the material.

It is within the spirit of my invention to select various substances for the core rod 3. Rods extruded from plastic materials, such as cellulose nitrate for example, could be employed. However, an important function of the core 3 is as a dimensioning means, to relate the inside diameter of the tubular structure 1 to a selected size of center pins to operate in bearings made from the material being described.

Therefore I prefer to employ metal rod for the member 3, in the form of continuously drawn wire which can be obtained in a precise dimension, for accurately defining the inside diameter of the bearing material. In making bearings the wire and its enclosing tubular structure are severed cleanly in one operation from parent material and the portion of the wire within the bearing expelled, as will be shown later herein. For this purpose the wire should cut cleanly without hard burrs. In a present practice of my invention I employ lead alloy wire composed of 70% lead and 30% tin, which is satisfactory, and I have found that this wire when .043" in diameter adapts the material of the present invention as bearings, to center pins .052" in diameter, after coating operations now to be described have been completed.

Figure 2 illustrates the application of a cementitious coating to the thus formed cylindrical material 4, wherein a coating chamber consists of a vertical array of three dies having axially alined drawing holes 5, 6 and 7, spaced on two hollow cylinders to provide two compartments 8 and 9. The intermediate die has additional, communicating holes 10 to permit free interchange of liquid between the two compartments 8 and 9 of the coating chamber which is maintained partially filled with a hardenable liquid cement 11 somewhat above the level of the intermediate die by a suitable constant level feed, not shown. The material 4 enters the chamber through the hole 5 in the bottom die, is immersed in the liquid 11 in the lower compartment 8, thence passes through the hole 6 in the intermediate die, is in further contact with the liquid 11 in the upper compartment 9, and is removed through the hole 7 in the top die.

Motion of the material is indicated by the vertical arrow in the figure.

The hole 5 in the bottom die is of such size as to permit ready passage of the material 4 therethrough, but its clearance is sufficiently small so as to prevent leakage of the liquid 11 from the coating chamber in view of the viscosity of the liquid and the upward motion of the material. The intermediate die performs a brushing operation. Its drawing hole 6 fits snugly around the material 4, and liquid 11 is thus "rubbed" thoroughly into the outer interstices of the braided tube 1 but is prevented from penetrating therein by the tightness of the braid.

The top die performs a metering operation. Its hole 7 is accurately selected so that a thickness of liquid coating is permitted to remain on the cylindrical material 4 issuing from the coating chamber, which coating on hardening provides a precise thickness of cementitious sheath encompassing the material. I have represented this hardening of the coating in Figure 2 by a gap between the material issuing from the coating chamber and completed material 12 above with a hardened coating 13. The liquid cement applied may be of a type containing dissolved solid which hardens by evaporation of solvent, and in that instance the material issuing from the coating chamber would be moved through an appropriate drying tower to result in the completed bearing material 12. It will be understood that the bearing material of my invention may be successively coated if necessary, with hardening between consecutive applications of liquid cement in the multiple coating, by appropriate equipment to obtain a desired result.

As an alternative to the precise coating operation described above, I may carry out excess coating, and after the coating has dried, remove surplus cementitious sheath in a precise manner. This I have represented in Figure 3 wherein material enclosed in dried surplus coating is drawn through a shaving die having an accurately selected hole 14, upward motion of the material through the die being indicated by the vertical arrow in the figure. The bottom surface of the die is ground so that the corresponding edge of the hole 14 is sharp and performs a cutting action on the surplus coating as illustrated to yield completed coated bearing material 12 of the same outside diameter as that of the precise coating operation of Figure 2, through selection of the size of the hole 14.

It will be understood that the operations of Figures 2 and 3, like that of Figure 1, can be carried out by machinery and since the operations of the three figures are essentially of the continuous type they may be joined in tandem as one continuous performance, if desired.

Coating cements of various formulas may be employed. In a present practice I prefer a nitrocellulose lacquer cement. It adheres strongly to the braided tube 1, develops satisfactory tensile strength on hardening, and increases the interlocking of the braid elements 2. This interlocking is particularly important if the braid elements are composed of nylon whose fibres are usually smooth. Nitrocellulose cement, moreover, can be reactivated after hardening, which has advantages which will be set forth later herein.

As precisely covered with an enclosing sheath the bearing material 12 of the present invention fits snugly into bearing holes 15 of a holding member 16 (Figure 4) and the density and resilience of the braid 1 are substantially retained by the adherence and tensile strength of the sheath 13 after the core rod 3 is removed. If, for example, the bearing holes 15 have a diameter of .106" I fabricate the material 12 to the same diameter or perchance .107" diameter since the material is slightly compressible and will enter slightly smaller holes 15 in the bearing forming operations about to be described. For this purpose, the cementitious sheath 13 contributes appreciably to the stiffness of the completed material 12. In fact, without the sheath, difficulties would be encountered, necessitating appreciable modifications.

As the bearing material of the present invention is thus prepared it comprises a stiff cylinder which may be thrust or pushed into a bearing hole, and not pulled in as is necessary in making piano action bearings in existing practices of the art wherein strips of wool cloth are necessarily employed. In Figure 4, I have shown this thrusting operation along with others for forming bearings in a holding member 16. The two approaching lengths of cylindrical material 12 comprising tightly braided tubing 1 on core rod 3 encompassed in cementitious sheath 13, enter the outer ends of the bearing holes 15 in the bifurcated member 16, in a forward, partially rotary motion as indicated by the arrows in the figure. Preferably I countersink the outer edges of the holes 15 to facilitate entrance of the cylindrical material.

The material 12 is thrust only as far as the inner ends of the holes 15 in the bearing holder 16. To limit the motion a suitable stop, not shown, may if necessary be provided. Upon complete insertion the material is cut off at the outer ends of the bearing holes 15, by thin rotating saws 17 brought into position at the proper time. I have found that jeweler's slotting saws .010" thick, 1½" diameter, 30 teeth per peripheral inch, hardened steel, rotated at about 8000 R. P. M. are satisfactory for the purpose. As part of the operations of Figure 4 I have shown two applicators 18 which apply liquid to the cylindrical lengths 12 as they enter the holes 15. This liquid may be a cement—again a nitrocellulose cement—for attaching the bearings of this invention in a wood holder 16.

It is a feature of my invention that the liquid carried by the applicators 18 may be a solvent for the cementitious coating 13 of the cylindrical material 12. In this the liquid may be a "slow" solvent attacking the coating after a lapse of time. The immediate function of the solvent is then a lubricant to facilitate inserting the cylinders 12 in the holes 15 and to keep the saws 17 clean in operation. Its further function, in attacking the coating 13 is to reactivate the coating somewhat as to cementing properties and thus to attach the bearings to the holder 16. If the coating 13 is a nitrocellulose cement the liquid as a "slow" solvent may comprise a mixture of Stoddard Solvent (a liquid petroleum product also known as Safety Solvent) two thirds and Cellosolve (ethylene glycol monoethyl ether) one third, by volume.

Completion of the bearing forming operations is illustrated in Figure 5. Drivers having end pins 19 somewhat smaller in diameter than the core rod 3, by forward, inward motions indicated by the arrows in the figure eject the portions of the core rod from the corresponding portions of the bearing material 12 embodied in the bearing holder 16 upon completion of the operations of Figure 4. If necessary, suitable stops not shown may be employed containing clearance holes for removal of core rod portions 3, to prevent ejection of bearings when the rod portions 3 are expelled.

The bearing forming operations in Figures 4 and 5 thus completed can be repeated indefinitely in a single machine with proper feeds and speeds for parts and material. It will be observed that the bearing material as used is employed economically in that, except for the negligible amounts destroyed by the saws 17, it is utilized entirely in bearings. The ejected portions of core wire 3 can be recovered as scrap metal to be remelted and redrawn. Moreover, none of the component materials set forth above in making bearing material or in forming bearings, are particularly costly.

The bearing material and the bearing forming operations described above admit of a ready means for initially lubricating a bearing. This I have included in Figure 5. Liquid lubricant from feed tubes 20 falls upon the end pins 19 of the core rod drivers, and upon the outer surfaces of the bearing holder 16 to flow down to the bearings, and is carried into the bearings with the forward motions of the drivers. As an alternative, it is not beyond my invention to lubricate a core wire 3 before a tube 1 is braided on it thus adding lubricant to the bearing material in its fabrication. The inner interstices in a braided tube 1 may function as a repository for lubricant. As a lubricant I may employ a one per cent solution of usual household soap in water, whereby though the water evaporates the pliant soap remains as a lubricating means.

Figure 6 shows the joining of two piano action members by a pivotal connection and Figure 7 illustrates a complete assembly so connected. The smooth metal center pin 21 is driven as indicated by the arrow in Figure 6 into the two bushings composed of braided tubes 1 and encompassing sheaths 13 in the holder or flange 16, with the end of a hammer butt 22 interposed and containing a hole in which the center pin fits tightly. In Figure 7 the hammer butt 22 is shown in full with the hammer shank and head attached. In a complete upright piano about 330 pivotal connections or centers such as have been described in this specification, would be employed, with a greater number in a grand piano.

I should like to point out another feature of the present invention, namely that the braid elements 2 of a bearing tube 1 are all disposed diagonally with respect to a center pin 21 which bears against them, as will be observed in the drawings. Thus all the braid elements are similarly effective in a bearing.

I have stated above that the core wire 3 in a bearing material 12 is somewhat smaller than a center pin to be employed in bearings made from the material. Thus a center pin 21 would be initially somewhat snug in the bearings. However, I have found that due, I believe, to compressional fatigue of the braid in the bearings and to plastic flow of the coatings 13, under pressure by the pin the center becomes free but firm with the bearings and pin in alinement, in a satisfactory amount of time, provided the relationship between the core wire and the center pin are substantially as described.

It will be understood that modifications may be made in my invention without departing from its spirit. Having thus described the invention, those features which I claim as new and novel and which I desire to protect by Letters Patent, comprise:

1. A composite material for bearings, comprising a dimensioning rod of a selected size related to a shaft to employ a bearing derived from the material, a tubular body composed of braided elements in close relationship tightly enclosing said rod, and a cementitious coating on said tubular body binding said braided elements in said close relationship but penetrating only partially into said body so that the interior portion thereof adjacent said rod is free of said coating, whereby upon inserting a portion of said material into an adapting bearing holder, upon removal of the corresponding portion of said rod an adapting bearing is formed suitable for a shaft related in size to said rod.

2. Material as in claim 1, wherein said cementitious coating is susceptible of at least partial reactivation, whereby said material may be readily attached to said bearing holder.

3. Material as in claim 1, wherein said rod and said tubular body in combination are insufficiently stiff, and wherein said coating stiffens said material sufficiently to withstand and thrust so as to permit endwise insertion of said material into a bearing holder without distortion.

4. A material for resilient bearings, comprising a dimensioning rod of a selected size related to a shaft to employ a bearing derived from the material, a tubular member of elastic substance tightly enclosing said rod, and a sheath tightly encompassing said tubular member, whereby upon inserting a portion of said material into an adapting bearing holder, upon removal of the corresponding portion of said rod a resilient bearing is formed suitable for a shaft related in size to said rod.

5. Material as in claim 4, wherein said tubular member consists of a plurality of entwined elastic filaments in close relationship, and wherein said sheath comprises a cementitious coating binding said filaments in said close relationship.

6. Material as in claim 4, wherein said sheath comprises a cementitious coating susceptible of at least partial reactivation, whereby said material may be readily attached to said bearing holder.

7. Material as in claim 4, wherein said rod and said tubular member in combination are insufficiently stiff, and wherein said sheath comprises a cementitious coating which stiffens said material sufficiently to withstand end thrust and to permit endwise insertion of said material into a bearing holder without distortion.

8. A composite material for bearings comprising textile strands tightly braided upon an expellable core, and an external cementitious coating covering said strands and penetrating between them to an extent short of saturation of the braided structure.

9. The structure as in claim 8, in which said core is a lead alloy wire and said textile strands are strands of nylon.

10. A composite material for bearings, comprising textile strands tightly braided upon an expellable core, an external cementitious coating covering said strands and penetrating between them to an extent short of saturation of the braided structure, and a lubricant in association with portions of said strands lying next to said core.

11. A process of producing bearing material which comprises continuously braiding elastic textile strands over an expellable core having cross-sectional dimensions smaller than a shaft with which said bearing material is to be used, said braiding being done with said strands under sufficient tension to flatten portions of them against said core, coating the continuous braided structure with a substantially superficial coating of cementitious substance, and hardening said substance whereby to maintain the tensioned condition of said strands and the external dimensions of said structure, prior to cutting said continuous structure into pieces for use.

12. The process claimed in claim 11 including the step of coating said core with lubricant prior to braiding said strands thereon.

13. A process of producing bearings which comprises forming a bearing material by continuously braiding textile strands over an expellable core having cross-sectional dimensions smaller than a shaft with which said bearing material is to be used, said braiding being done under sufficient tension to flatten portions of said strands against said core, coating the continuous braided structure so formed with a substantially superficial coating of cementitious substance and hardening said substance whereby to maintain the tensioned condition of said strands and the external dimensions of said structure, inserting an end of said structure into a perforation in a bearing holder accompanied by reactivation of said cementitious coating to hold it therein, cutting off said structure including said core adjacent the face of said bearing holder, expelling said core, and inserting said shaft.

14. A method of making bearings which comprises providing bearing material in the form of a tubular body surrounding an expellable core, and a bearing holder having an opening therein adapted to receive a portion at least of said bearing material, inserting said bearing material into the opening in said bearing holder, severing said material including said core adjacent the face of said bearing holder, and thereafter expelling the portion of said core contained in the material within said holder.

15. A method of making bearings which comprises providing bearing material in the form of a tubular body composed of braided elements in close relationship and tightly enclosing a dimensioning rod of a selected size related to a shaft to employ a bearing derived from said material, and a bearing holder having an opening therein adapted to receive a portion at least of said bearing material, inserting said bearing material into the opening in said bearing holder, applying a cementitious substance to the exterior surface of said material as it is being inserted in the opening in said holder, said cementitious substance serving to attach said materials to said holder, severing said material including said rod adjacent the face of said bearing holder, and thereafter expelling the portion of said rod contained in the material within said holder.

16. A method of making bearings which comprises providing bearing material in the form of a tubular body composed of braided elements in close relationship and tightly enclosing a dimensioning rod of a selected size related to a shaft to employ a bearing derived from said material, and a bearing holder having an opening therein adapted to receive a portion at least of said bearing material, inserting said bearing material into the opening in said bearing holder, severing said material including said rod adjacent the face of said bearing holder, and thereafter expelling the portion of said rod contained in the material within said holder by means of a pin somewhat smaller in diameter than said rod, and including the step of applying lubricant to the interior surface of said bearing.

ARMAND F. KNOBLAUGH.

REFERENCES CITED

The following references are of record in the file of this patent:

UNITED STATES PATENTS

| Number | Name | Date |
| --- | --- | --- |
| 937,021 | Cobb | Oct. 12, 1909 |
| 1,094,879 | Cobb | Apr. 28, 1914 |
| 1,104,777 | Cobb | July 28, 1914 |
| 1,369,196 | Semple | Feb. 22, 1921 |
| 2,025,830 | Rosmait | Dec. 31, 1935 |

FOREIGN PATENTS

| Number | Country | Date |
| --- | --- | --- |
| 500,077 | Great Britain | Feb. 2, 1939 |